Oct. 23, 1934. W. L. DONKIN 1,978,345
AIR INFLATING DEVICE
Filed Jan. 22, 1931 2 Sheets-Sheet 1

Inventor
William L. Donkin
Kwis Hudson & Kent
attys.

Oct. 23, 1934.     W. L. DONKIN     1,978,345
AIR INFLATING DEVICE
Filed Jan. 22, 1931     2 Sheets-Sheet 2
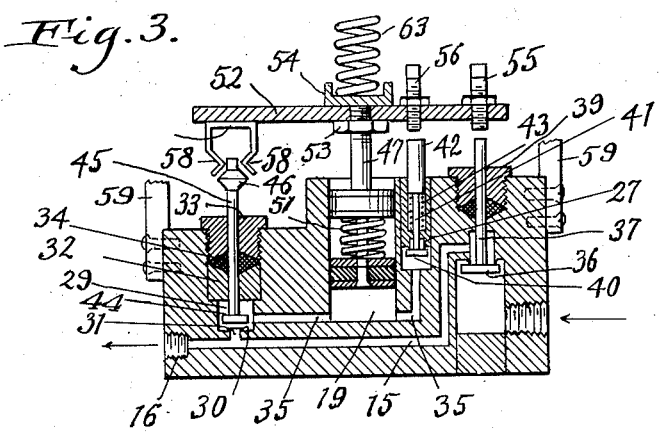
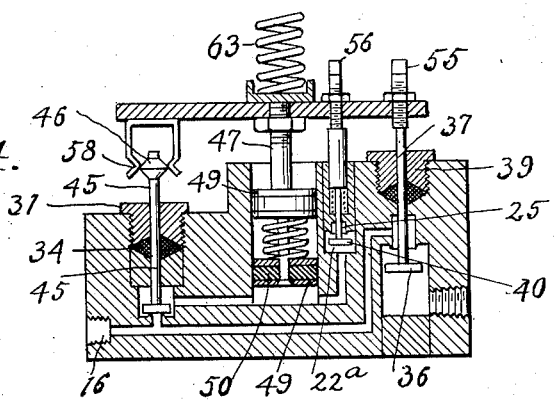
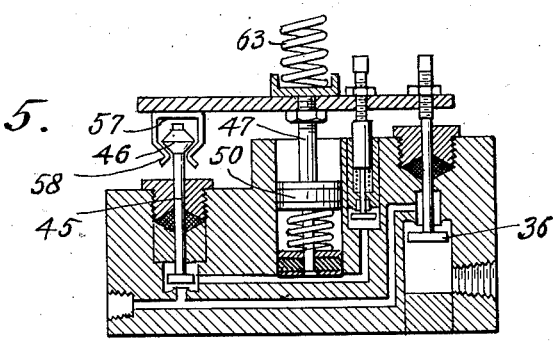

Patented Oct. 23, 1934

1,978,345

UNITED STATES PATENT OFFICE 1,978,345

AIR INFLATING DEVICE

William L. Donkin, Longmont, Colo., assignor to Julia Donkin, Longmont, Colo.

Application January 22, 1931, Serial No. 510,463

4 Claims. (Cl. 50—8)

This invention relates to fluid pressure inflating devices and particularly to a device for inflating pneumatic tires of motor vehicles, although it has utility wherever it is desired to inflate a receptacle with fluid to a given pressure.

An object of the invention is to provide a fluid pressure inflating device of the so-called "pulsating" type which is simple in construction and is positive and accurate in its operation.

A further object is to provide a fluid pressure inflating device particularly adapted for inflating pneumatic tires to a given pressure wherein the device may be quickly adjusted for inflating the tire to the desired pressure and the operative parts thereof during the inflating operation will continue to pulsate until such pressure is obtained whereupon the device will cease to operate and the air supply will be shut off.

An additional object is to provide an inflating device capable of being adjusted so that a pneumatic tire may be accurately inflated to the desired pressure without any danger or over-inflation and wherein the device itself will serve to indicate that the desired pressure has been obtained in the tire.

A still further object is to provide a device of this character which is so constructed that it may be incorporated in the air line or in the air chuck on the end of an air line, or which may be placed in a stationary standard or housing.

Additional objects and advantages will become apparent hereinafter.

An embodiment of the invention is illustrated in the accompanying drawings wherein Figure 1 is a sectional view through the device, the valves and operative parts thereof being shown in positions slightly different from any positions they would occupy during normal operation of the device and the piston being shown at the extreme bottom of the cylinder.

Fig. 3 is a view similar to Fig. 1 but showing the operative parts of the device in the relative positions they occupy when the device is connected to a source of fluid pressure and before the outlet end of the device is connected by an air chuck or other means to a valve stem of a tire or other receptacle.

Figures 1, 2:
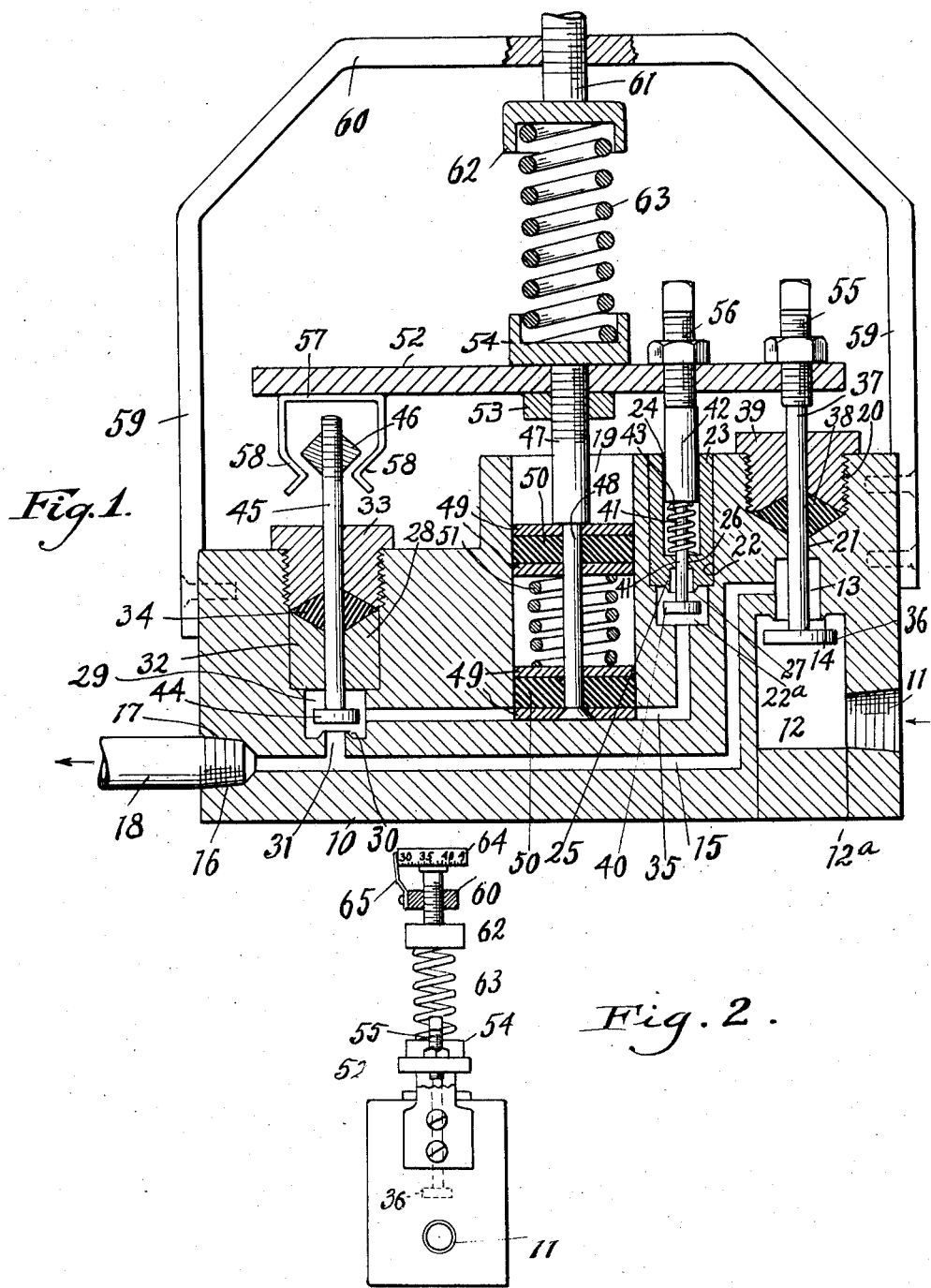
Fig. 2 is a reduced elevational end view of the device looking from the right-hand side of Fig. 1, certain portions of the device being broken away and shown in section.

Fig. 4 is a view similar to Fig. 3 but showing the relationship of the operative parts of the device after the outlet side thereof has been connected to the valve stem and the diminished air pressure in said outlet side has permitted the device to function to open the primary and bleeder valve and to close the auxiliary valve on the outlet side; and Fig. 5 is a view similar to Fig. 4 but showing the relationship of the operative parts of the device just subsequent in the operative cycle to that portion of the cycle disclosed in Fig. 4.

In the accompanying description like reference characters will refer to like parts in the several views of the drawings.

The fluid inflating device of the present invention having particular utility when employed as an air inflating device for pneumatic tires of motor vehicles will be described by way of illustration as used in that connection.

In inflating pneumatic tires, particularly balloon tires, it has been found desirable to utilize an inflating device of the so-called "pulsating" type wherein the air is supplied to the tire from a source of supply in a series of short impulses or gulps, the delivery of each impulse of air being accompanied by a pulsation of the operative parts of the device until the tire has been inflated to the desired pressure whereupon the delivery of air to the tire and the pulsations of the device cease. This form of inflating device enables the tire to be inflated accurately to the desired pressure without necessitating the use of a separate gauge member to determine the pressure, since it indicates by the cessation of the pulsations that the tire has been properly inflated. The device of the present invention is of this type and is designed so that its action is positive and accurate while its construction is simple and relatively inexpensive to manufacture and to maintain.

The device comprises a housing 10 illustrated herein as a substantially rectangular block-like member which may be made in the form of a casting if desirable. Adjacent one end the housing 10 is provided with a threaded passage 11 to which may be attached an air line (not shown) from a source of supply of air pressure, this side of the housing constituting the inlet side of the device.

The passage 11 communicates with a chamber 12 in the housing, the latter, in turn, communicating with a smaller chamber 13, there being an annular valve seat projecting into the chamber 12 and surrounding the entrance to the chamber 13. The chambers 12 and 13 with the valve seat 14 are formed from a recess extending inwardly from the under side of the housing 10 (as viewed in Fig. 1), the open end of the recess being closed by a plug or other means 12a.

A passage 15 extends from the chamber 13 through the housing 10 to the opposite end of the housing where the passage is enlarged and threaded, as indicated at 16, to receive the threaded end of an air line 18, which has on its other end a suitable air chuck or other device (not shown) as is well understood, this end of the device being the outlet side thereof.

The housing 10 has a portion reduced in thickness or height adjacent the outlet side of the device and is provided adjacent such portion with a cylindrical recess 19 extending inwardly of the housing from the upper side thereof and constituting a cylinder cooperating with a piston later to be described.

The housing 10 is further provided with a threaded recess 20 in its upper side in alignment with the chamber 12, the bottom of this recess 20 having downwardly inclined walls terminating adjacent their apex in an opening 21 leading from the recess 20 into the chamber 13, this arrangement being for a purpose later to be made clear.

Another recess indicated at 22 and somewhat smaller than the recess 20 is formed in the housing 10 intermediate said recess 20 and the recess or cylinder 19, this recess 22 having adjacent its inner end a reduced portion 22a constituting as will later be seen a valve chamber.

The recess 22 is closed by a plug member 23 which extends into the recess and bears against the shoulder formed thereon by the reduced portion 22a. The plug member 23 is provided with a recess 24 extending inwardly and centrally thereof from its upper side, as viewed in the drawings, and with a second recess 25 extending inwardly and centrally thereof from the under side, the two recesses having their inner ends separated but in communication through an opening 26 which also serves as a guide opening for a valve pin later to be described and as an air passage for the air passing through the bleeder valve. The end of the plug member 23 adjacent the reduced portion 22a of the recess 22 is formed to provide a valve seat 27, preferably of truncated conical form, surrounding the recess 25 in the plug 23.

The housing 10 adjacent the outlet side of the device is provided with another recess 28 extending inwardly thereof from the upper side of the housing, as viewed in the drawings, such recess having a reduced portion 29 at its inner end and a threaded portion at its upper end. The bottom of the reduced portion 29 of the recess is formed to provide a valve seat 30 which surrounds the inner end of a passage 31 extending from the recess to the passage 15. The recess 28 is closed by means of a spacer plug 32 which bears upon the shoulder formed by the reduced portion 29 of the recess and a nut 33 screwed into the threaded portion of the recess both the plug 32 and the nut 33 having aligned central openings therethrough to slidably receive a valve pin, while packing 34 is arranged between adjacent ends of the plug and nut.

All of the recesses, chambers, and the cylinder 19 are arranged in alignment longitudinally of the housing and preferably along the longitudinal center line through the housing, the purpose of such arrangement becoming clear in connection with the further description of the construction and operation of the device.

A passage 35 connects the valve chambers formed by the reduced portions 22a and 29 of the recesses 22 and 28 respectively, the passage 35 being so arranged that it opens into the recess or cylinder 19 on opposite sides and at the bottom thereof.

A valve, which may be designated herein as a primary valve, has its valve head 36 arranged in the chamber 12 with its valve pin 37 projecting through the smaller chamber 13, the opening 21, packing 38, and an opening in a nut 39 screwed into the recess 20, the outer end of the pin 37 extending beyond the nut 39. The valve may be arranged in the housing by inserting the same into the chamber 12 before the open end of the chamber has been closed by the plug 12a.

A valve, which may be conveniently termed a bleeder valve, is movably mounted in the housing 10 with its head 40 within the valve chamber 22a and its pin 41 extending through the opening 26 into the recess 24 in the plug member 23, it being understood that the pin has a loose fit in the opening. The outer end of the pin 41 has fixed thereon, after the head 40 and pin 41 have been positioned in the chamber and opening, an enlarged cylindrical member 42, the outer end of which extends beyond the top of the housing 10 as viewed in the drawings, while its inner ends form an abutment for a spring 43 arranged on the pin 41 and engaging the bottom of the recess 24, whereby the valve head 40 will be normally maintained seated on the valve seat 27.

A third valve is mounted in the housing 10 and has its head 44 arranged in the valve chamber 29 at the outlet side of the device and is adapted to seat on the valve seat 30 within said chamber. The valve pin 45 of this valve extends from the head 44 through the openings in the spacer plug 32 and nut 33 so as to be slidably mounted in such members, while the outer end of the pin 45 which extends beyond the outer side of the nut 33 is provided with an enlargement in the form of a square through which the pin extends diagonally from one corner to the other thereof, as indicated at 46, with the other corners of the enlargement lying outwardly of the pin.

A piston is arranged in the recess or cylinder 19 and comprises a piston rod 47 having a reduced portion 48 at its inner end and upon which is mounted the piston head. The piston head is formed of two spaced portions each of which consist of two spaced metal plates 49 between which is arranged a flexible packing 50. The portion of the piston head at the inner end of the rod is fixed to the rod while the other portion of the head is movable on the rod, this latter portion being held however against the enlarged portion of the rod by a relatively stiff spring 51 arranged between the two piston head portions.

The piston rod 47 extends beyond the upper side of the housing 10 and has a cross arm 52 arranged on a threaded portion adjacent the outer end of the rod, which cross arm extends in the longitudinal direction of the housing 10 and is secured on the rod 47 between a nut 53 and a cup shaped member 54. Threaded bolts 55 and 56 are adjustably mounted in the cross arm 52 in alignment with the outer ends of the valve pin 37 and 42, respectively, such bolts extending through the cross arm so that their lower ends will engage with the said valve pins in certain positions of the arm.

The end of the cross arm 52 opposite to that in which the bolts 55 and 56 are arranged carries on the under side of the arm a substantially U-shaped spring member 57, the outer ends of the legs of which are off-set inwardly as indicated at 58 to form oppositely facing substantially V-shaped portions, the purpose of which will become clear during the description of the operation of the device that is to follow.

A substantially U-shaped bracket member has its legs 59 secured at their free ends to the opposite ends of the housing 10 while the base 60 of the bracket is located above the upper side of the housing, as viewed in Figure 1, and extends longitudinally of the housing in the vertical plane of the longitudinal center line thereof. The base 60 of the bracket is provided substantially midway of its ends with a threaded opening to adjustably receive a threaded bolt 61, the lower end of which bears upon an inverted cup-shaped member 62, a spring 63 calibrated in terms of air pressure being arranged between the members 54 and 62 with its opposite ends held in place within the cups of these members.

The outer end of the threaded bolt 61 has fixed thereon an operating drum or knob 64, on the periphery of which is a scale graduated in terms of air pressure and cooperating with a pointer 65 fixed to the base 60 of the bracket (see Fig. 2).

Although the inflating device has not been illustrated herein as mounted in a fixed standard or container, or as incorporated in an air line or air chuck, or in any other arrangement that may be desired, it will be understood that such are the many cases in which the device is intended to be used and that during the following description of the operation of the device it should be considered as so mounted with the inlet side of the device connected to a source of supply of pressure fluid and the outlet side connected to a fluid line that has on its end an air chuck or other suitable device that may be applied to a valve stem.

As previously mentioned the positions of the operative parts of the device, as viewed in Fig. 1, do not correspond to any positions actually assumed by such parts during the operation of the device or when the inlet side thereof is connected to a source of fluid pressure supply, and, therefore, the following description of the operation of the device will be based on the showing of Figs. 3, 4 and 5.

Referring to Fig. 3 the primary valve 36, bleeder valve 40, piston, and valve 44 are in the relative positions they occupy when the device is connected on its inlet side to a source of supply of pressure fluid, while its outlet side is connected to an air line the end of which is sealed by an air chuck or other device. Under these conditions the primary valve 36 and bleeder valve 40 are seated and the piston is in its outer position, while the valve 44 is open.

The device being arranged in an air line intermediate the air chuck and the source of air supply, the valves and piston will be in the position shown in Fig. 3 and the device ready for use. It being desired to inflate a tire, the drum 64 is turned to bring the numeral on the scale that corresponds to the desired pressure for the tire into alignment with the pointer 65. This movement of the drum varies the tension of spring 63, it being remembered that such spring is accurately calibrated in terms of air pressure. The air chuck or other device on the end of the air line 18 can now be positioned upon the valve stem of the tire to be inflated, whereupon the air in the line 18, passages 15 and 35, cylinder 19 below the piston, and the valve chamber 29 will flow into the tire and thus reduce the air pressure in the portions of the device just mentioned. As the air pressure in the cylinder 19 below the piston falls, the spring 63 comes into action and moves the piston inwardly of the cylinder and the cross-arm 52 carried by the piston rod 47 toward the top of the housing 10. This movement of the cross-arm 52 first brings the inwardly off-set V-shaped portions 58 of the legs of the spring member 57 into contact with the inclined top sides of the enlargement 46 on the valve pin 45, so that the continued inward movement of the cross-arm results in forcing the valve head 44 onto its seat 30, thus closing the valve chamber 29 with respect to the passage 15.

At the moment the valve 44 seats, the portions 58 of the spring 57 are almost at the corners of the enlargement 46 which lie outwardly of the pin 47. The adjustable bolt 56 carried by the cross-arm is just out of engagement with the enlarged portion 42 of the valve pin 41, and the adjustable bolt 55 is also just out of engagement with the valve pin 37.

The distance separating the ends of the bolt 55 and pin 37 at this portion of the operative cycle is slightly greater than the distance between the bolt 56 and the portion 42 of the other valve pin. Continued inward movement of the cross-arm 52 under the influence of the spring 63 first opens the bleeder valve 40, such valve being depressed against the tension of the spring 43 by the bolt 56, to allow the air in the cylinder 19 below the piston and in the passage 30 to bleed outwardly of the housing through the recess 25, opening 26 and into the recess 24.

Just subsequent to the opening of the bleeder valve 40, the valve pin 37 of the primary valve is depressed by the bolt 55, so that the valve head 36 is unseated, whereupon the air from the inlet line passes through the chambers 12 and 13 and through the passage 15 to the outlet line 18. This relationship of the operative parts of the device is disclosed in Fig. 4, it being noted that as soon as the bleeder and primary valves have been opened the portions 58 of the spring arm 57 pass over the corners of the enlargement 46 and, due to their spring action, snap into engagement with the under inclined sides of such enlargement to impart to the valve head 40 a quick unseating movement, after which the air pressure in the passage 15, it being remembered that the primary valve 36 is unseated, is sufficient to raise or entirely unseat the valve 44.

The piston, while never reaching the bottom of the cylinder in actual operation, does come in its inward movement almost into engagement with the bottom of the cylinder, there being, however, a slight clearance between the inner end of the piston and the bottom of the cylinder. This clearance is sufficient to allow the air, as soon as the valve head 44 is unseated, to pass through the chamber 29 and passage 35 into the cylinder beneath the piston, whereupon the latter immediately starts its outward movement against the tension of spring 63. A slight outward movement of the piston is sufficient to disengage the bolt 56 and the enlargement 42 on the valve pin 41, whereupon the bleeder valve 40 quickly seats and allows the air pressure in the cylinder to build up, so as to quickly move the piston outwardly of the cylinder against the tension of the spring 63.

This further movement of the piston outwardly of the cylinder, together with the cross-arm 52 carried by the piston rod, separates the bolt 55 from the valve pin 37, after which the incoming air pressure in the chamber 12 is sufficient to close or seat the valve head 36. The outward movement of the cross-arm just mentioned causes the portions 58 of the spring arms of the spring 57 to engage the underside of the enlargement 46 and to draw the pin 45 and valve head 44 outwardly until the head abuts the spacer plug 32, whereupon the spring arms will snap over the corners of the enlargement and move to the position indicated in Fig. 3.

As soon as the air pressure in the passages 15 and 35 and the cylinder 19 beneath the piston and the chamber 29 has again fallen below the point at which the scale on the drum 64 is set, the spring 63 will move the cross-arm 52 and the piston inwardly toward the housing and effect an operation of the valves corresponding to that just set forth. In the operation of the device, each cycle of operation may be likened unto a pulsation, since there is an outward movement of the cross head and then an inward movement thereof creating an audible and apparent pulsation in the device. So long as the air pressure in the tire is below that pressure to which the device has been set these pulsations will continue, and during the course of each a small amount of air will be delivered to the tire. As soon as the air pressure in the tire reaches the desired amount, it is apparent that no reduction in air pressure in the cylinder 19 below the piston will take place, and that the air pressure on one side of the piston and the spring pressure on the other side thereof will be equally balanced and the device will cease to function.

A device of this character is simple, and is positive and accurate in its operation. It only employs the simplest forms of valves, while the spring is such that it may be accurately calibrated in terms of air pressure. By delivering the air to the tire in small blasts or gulps the tire may be accurately inflated to the desired pressure, and all danger of over-inflation obviated. The audible and apparent pulsations taking place in the device during its operation render the use of an air gauge unnecessary, since as soon as the device ceases to operate and becomes silent, it will be instantly known that the tire has been inflated to the desired pressure.

It should further be noted that the structural arrangement of the operative parts of the device is such that the whole device may be incorporated in a small space, and because of this fact the device may be arranged as a hand device on or adjacent to the air chuck of an air line, or it may be made on a larger scale and placed in stationary standards or housings, such as are frequently seen at filling stations in connection with inflating devices of the pulsating type that are now in use.

Although a preferred embodiment of the invention has been illustrated and described herein, it should be understood that the invention is susceptible of various modifications and adaptations within the scope of the appended claims.

Having thus described my invention I claim:

1. An air inflating device having a passage connecting the inlet and outlet sides of the device, a valve normally closing the inlet side of said passage, a cylinder, a piston in said cylinder, a passage connecting said cylinder and said first named passage, a valve for closing said last named passage, and a normally closed bleeder valve associated with the inner end of said cylinder, said piston having means associated therewith and including an adjustable spring tensioned actuating member, whereby when the air pressure in said first named passage falls below a predetermined point said piston will move in one direction in the cylinder under the spring tension to first close said second named valve, open said first named and said bleeder valves, and then allow said second named valve to reopen, and will move in the opposite direction in the cylinder under the air pressure in said first named passage to allow said first named and said bleeder valves to close.

2. An air inflating device having a passage connecting the inlet and outlet sides of the device, a primary valve normally closing the inlet side of said passage, a cylinder, a passage connecting said cylinder with said first named passage, a control valve for closing said last named passage, a normally closed bleeder valve associated with said cylinder, a piston in said cylinder having a cross-arm associated therewith and provided with means having an operative association with all of said valves, and an adjustable spring for moving said piston and cross-arm in one direction, when the air pressure in said first named passage falls below a predetermined point to close said control valve, open said primary and bleeder valves, and then allow said control valve to reopen, said piston and cross-arm being moved by the air pressure in said first named passage in the opposite direction to allow said primary and bleeder valves to close.

3. An air inflating device having a passage connecting the inlet and outlet sides of the device, a primary valve normally closing the inlet side of said passage, a cylinder, a passage connecting said cylinder with said first named passage, a control valve for closing said last named passage and having a valve pin, a normally closed bleeder valve associated with said cylinder, a piston in said cylinder having a cross-arm associated therewith and provided with means having an operative association with said primary and bleeder valves, and an adjustable spring for moving said piston and cross-arm in one direction, said control valve pin and said cross arm having cooperating means whereby when said cross-arm is moved under the action of said spring said control valve will first be closed and then be free to open.

4. An air inflating device having a passage connecting the inlet and outlet sides of the device, a valve normally closing the inlet side of said passage, valve operating means in communication with said passage and controlled by the air pressure therein, a control valve for closing the communication between said passage and said means and provided with a pin having an enlargement thereon with substantially wedge-shaped portions oppositely disposed with respect to the axis of the pin, and a normally closed bleeder valve associated with said means, said means including spaced spring fingers adapted to cooperate with the enlargement of said control valve pin to move said control valve to closed position and then allow the control valve to be moved to open position.

WILLIAM L. DONKIN.